United States Patent Office 2,985,583
Patented May 23, 1961

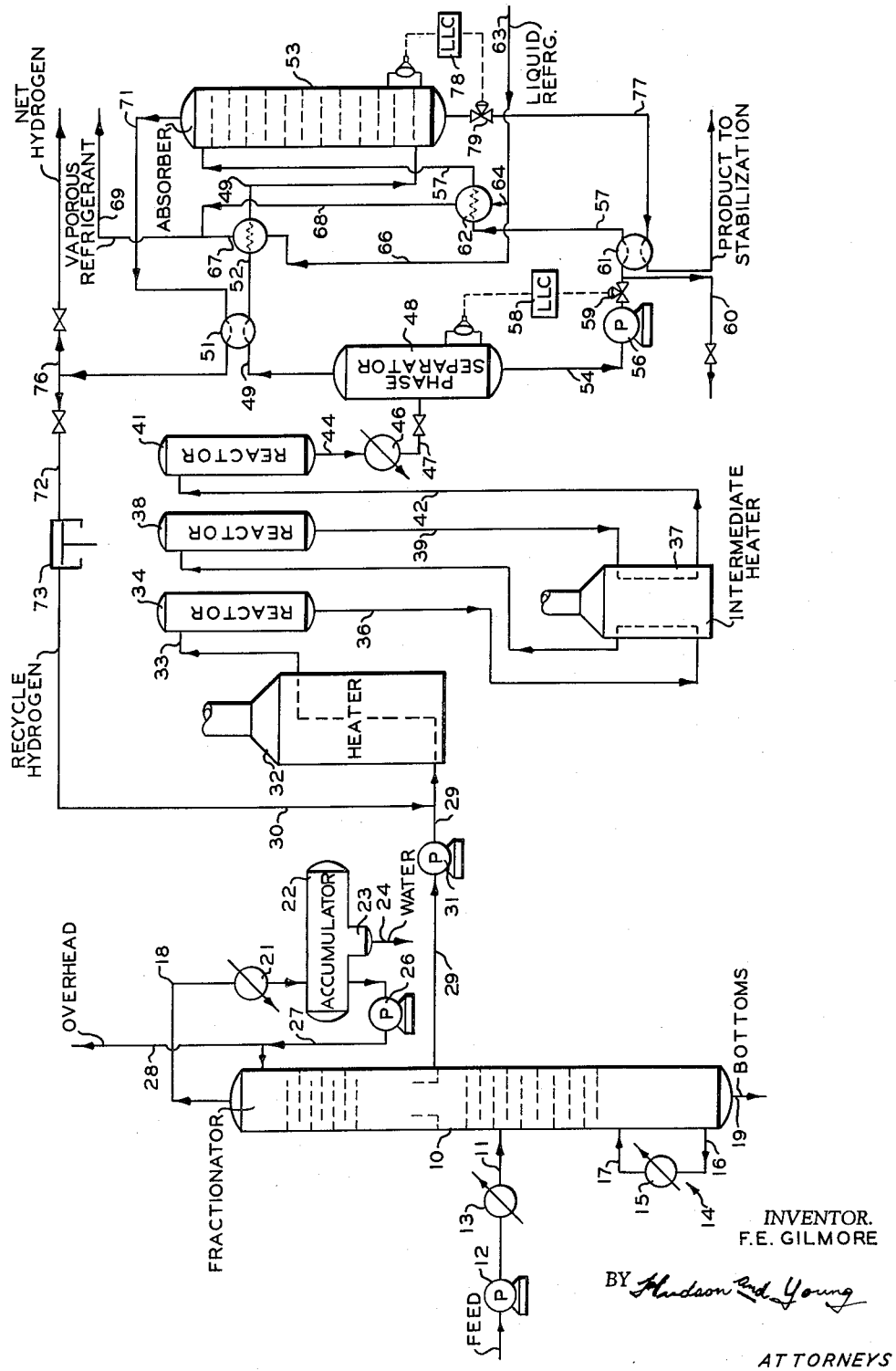
INVENTOR.
F.E. GILMORE
BY Hudson and Young
ATTORNEYS

2,985,583

CATALYTIC REFORMING PROCESS

Forrest E. Gilmore, Bartlesville, Okla., assignor to Phillips Petroleum Company, a corporation of Delaware Filed Aug. 26, 1957, Ser. No. 680,182

4 Claims. (Cl. 208—101)

This invention is concerned with an improved process for catalytically reforming hydrocarbons. In one aspect, the invention relates to a method for treating the hydrogen-containing gases recovered from catalytic reforming processes. In another aspect, it relates to an improved system for catalytically reforming hydrocarbons.

Several different processes for catalytically reforming hydrocarbons are described in the literature. Depending upon the paritcular process, a number of different reactions occur in reforming, including dehydrogenation, cyclization, aromatization, isomerization, hydrocracking and desulfurization. The specific reactions which occur depend for the most part upon the catalyst used and the conditions under which the process is practiced. Examples of catalysts used in the various processes include molybdena-on-silica, a combination of platinum and synthetic silica-alumina, cobalt-molybdate catalyst, chromia-alumina bead catalyst, and platinum-alumina-combined halogen catalyst. The various reforming processes have at least one thing in common in that the reactions are carried out in the presence of hydrogen which is also produced in the processes. In a conventional operation, a gas stream containing hydrogen and low molecular weight hydrocarbons is separated from the reactor effluent, and at least a portion of this stream is then recycled to the reactor. Such a method of operation is uneconomical in that it results in the loss of light hydrocarbons, such as propane and butane, with the excess hydrogen. Furthermore, the presence of these light hydrocarbons in the recycle stream causes a decrease in the total amount of feed material which can be charged to the reactor system.

It is an object of this invention, therefore, to provide an improved catalytic reforming process.

Another object of the invention is to provide a catalytic reforming process in which the recycled stream returned to the reactor contains substantially pure hydrogen.

Still another object of the invention is to provide a catalytic reforming process which makes possible a substantial increase in the amount of feed which can be charged to the process.

A further object of the invention is to provide a catalytic reforming process in which the losses of light hydrocarbons which occur in conventional processes are substantially reduced.

A still further object of the invention is to provide an improved system for use in reforming hydrocarbons.

Other and further objects and advantages of the invention will become apparent to one skilled in the art upon consideration of the accompanying disclosure.

Broadly speaking, the instant invention resides in an improved process and system for catalytically reforming hydrocarbons. In one embodiment, in a process in which a hydrocarbon charge stock, e.g., straight run gasoline, is contacted in a reaction zone with a reforming catalyst in the presence of hydrogen and product vapors are recovered therefrom, the invention resides in the improvement which comprises cooling the product vapors to a temperature at which the vapors are partially liquefied, passing the resulting vaporous and liquid materials into a separation zone, recovering a vaporous stream comprising hydrogen and light hydrocarbons from the upper portion of the separation zone, recovering a liquid hydrocarbon stream from the lower portion of the separation zone, separately cooling the vaporous and liquid streams, countercurrently contacting the vaporous and liquid materials in an absorption zone, recovering a hydrocarbon stream enriched with respect to light hydrocarbons from the bottom of the absorption zone, recovering a hydrogen enriched stream from the upper portion of the absorption zone, and recycling at least a portion of the latter stream to the reaction zone. The stream recovered from the bottom of the absorption zone is then passed to a stabilization zone wherein the light hydrocarbons are separated and stabilized gasoline is recovered as a product of the process.

In another embodiment, the invention resides in a system for reforming hydrocarbons which comprises at least one reactor comprising an enclosed shell, a feed inlet line connected to an upper portion of the shell, an indirect heat exchanger positioned in the feed inlet line, a product outlet line connected to a lower portion of the shell, a gas-liquid phase separator, first conduit means connected between the product outlet line and an intermediate portion of the separator, a cooler positioned in the first conduit means, an absorber vessel, second conduit means extending from a lower portion of the separator to an upper portion of the absorber vessel, a first refrigeration means disposed in the second conduit means, third conduit means extending between an upper portion of the phase separator and a lower portion of the absorber vessel, a second refrigeration means disposed in the third conduit means, an outlet conduit means connected to a lower portion of the absorber vessel, and fourth conduit means attached to an upper portion of the absorber vessel and being further connected to the feed inlet line on the inlet side of the indirect heat exchanger.

A more comprehensive understanding of the invention can be obtained by referring to the drawing which is a flow diagram illustrating a preferred embodiment of the invention. While the invention is specifically described hereinafter with relation to a "Platforming Process," it is to be understood that it is applicable to any reforming process which is carried out in the presence of hydrogen employing any suitable reforming catalyst.

Referring now to the drawing, a feed material, e.g., a naphthenic type gasoline or naphtha charge stock, is introduced into an intermediate portion of fractionator 10 through line 11. The feed material prior to being pumped into fractionator by means of pump 12 passes through heater 13 wherein the material is heated to a temperature which is about equal to that existing in that particular portion of the fractionator. Depending upon the specific separation to be made, this temperature generally falls in the approximate range of 200 to 300° F. The fractionator is a conventional item of separation equipment provided with suitable trays as shown. Heat is supplied to the lower end of the column by reboiler 14 which comprises a heater 15 connected to the bottom of the colum by means of heater inlet and outlet lines 16 and 17. Liquid material is withdrawn from the bottom of the column through line 16, and after passing through heater 15, is returned to the column through line 17. The fractionator makes it possible to charge to the reforming process a feed material having a desired boiling point range. The charge to the fractionator generally contains some hydrogen sulfide and light hydrocarbons boiling below 150° F. and some heavier material boiling above 400° F. It is generally desired to charge to the reforming process feed material having a boiling point range of about 150 to 400° F. However, it is to be understood that it is not intended to limit the invention to a feed material having this particular boiling point range, for materials having narrower and wider boiling point ranges can be employed. Material boiling below about 150° F. is taken overhead from fractionator 10 through line 18, while material boiling above about 400° F. is withdrawn as bottoms through line 19.

After being condensed in condenser 21, the overhead from the fractionator is passed into accumulator 22. Water which collects in water trap 23 if the accumulator is withdrawn through line 24. A stream comprising hydrocarbons is pumped from the accumulator by means of pump 26 and then recycled to the upper portion of the fractionator through line 27 as reflux therefor. The portion of the hydrocarbons which it is not desired to recycle to the fractionator is withdrawn from the system through line 28.

A hydrocarbon stream having an approximate boiling point range of 150 to 400° F. is recovered from an intermediate portion of the fractionator through line 29. This hydrocarbon stream generally contains paraffins, some aromatics, and naphthas. The composition of a typical naphtha charge stock such as is recovered from the fractionator through line 29 is about as follows: 40 percent normal paraffins, 5 percent isoparaffins, 10 percent aromatics, and 45 percent naphthenes. As mentioned hereinbefore, the reforming process is carried out in the presence of hydrogen. Line 30 connected to line 29 provides means for adding hydrogen to the feed stock prior to its introduction into the reaction zone. Since hydrogen is formed in the reforming reaction, the hydrogen supplied through line 30 is hydrogen recovered from the reaction zone effluent in a manner to be described in detail hereinafter. The amount of hydrogen added can vary within rather wide limits, e.g., from about 5 to about 9 mols of hydrogen per mol of charge stock. The naphtha charge stock containing hydrogen is pumped through line 29 by means of pump 31 into heater 32 wherein the material is heated by indirect heat exchange. Heater 32 can be, for example, a coil type heater wherein the feed stream is heated by indirect heat exchange with hot combustion gases. In heater 32, the feed material is heated to the temperature at which it is desired that it be introduced into the reactor. This temperature is generally in the range of about 800 to 950° F., with the pressure being in the range of about 500 to 800 p.s.i.g. After the feed material has been heated in this manner, it is passed by means of line 33 into reactor 34, the first of the three reactors which are included in the particular reactor system illustrated.

In reactor 34, the feed material contacts the reforming catalyst which is disposed therein, e.g., in a fixed bed. In a "Platforming Process" a catalyst is employed which consists essentially of alumina, platinum, and halogen combined with alumina in an amount from about 0.1 percent to about 8 percent by weight of the alumina on a dry basis. For a more complete description of this catalyst and a method for its preparation, reference may be had to U.S. Patent No. 2,479,109, issued to V. Haensel on August 16, 1949.

The reactor effluent withdrawn from reactor 34 through line 36 is passed through an intermediate heater 37 prior to being introduced into an upper portion of reactor 38. The reaction occurring in the reactors is an endothermic or cooling reaction so that it becomes necessary to heat the effluent from one reactor to a desired reaction temperature prior to its introduction into another reactor. The reactor effluent withdrawn from reactor 38 through line 39 is flowed through heater 37 prior to its introduction into reactor 41 through line 42. In general, the heat supplied to the charge of any one of the reactors is sufficient to ensure that the temperature in that reactor does not fall below about 800° F. In passing through the reactors, most of the naphthenes contained in the feed material are converted to aromatics, while part of the paraffinic materials become cyclics and are then dehydrogenated to aromatics. When utilizing a three-reactor system such as herein disclosed, most of the conversion takes place in the first reactor so that it is necessary to heat the material introduced into the first reactor to a higher temperature than is necessary in the case of the other reactors. As previously indicated, the reforming process is carried out in the presence of hydrogen, which is also produced during the process. While the reforming process has been described with relation to a reactor system which comprises three reactors, it is to be understood that it is not intended to limit the invention to any particular number of reactors. Thus, the reaction can be carried out in a single reactor, in two reactors, or more than three reactors can be employed if desired. The three reactors shown in the drawing can actually be considered a single reaction zone which has been divided into three sections in order to facilitate conduct of the process.

The product vapors withdrawn from reactor 41 through line 44 are passed into cooler 46 wherein the vapors are partially liquefied. The resulting vaporous and liquid materials are next passed by means of line 47 into gas-liquid phase separator 48. The temperature in the separator is generally in the range of about 85 to 100° F., with the pressure being in the range of 400 to 500 p.s.i.g. In the separator, the liquid materials collect in the bottom while a vaporous stream comprising hydrogen and light hydrocarbons is taken overhead through line 49. After passing through indirect heat exchanger 51 and refrigerated exchanger 52, the vaporous stream is introduced into the bottom portion of absorber 53. The vaporous stream in flowing through heat exchanger 51 is cooled to a temperature in the range of about 70 to 85° F., while in refrigerated exchanger 52 the stream is further cooled to a temperature in the range of about 35 to 45° F.

The liquid hydrocarbon stream or reformate, which is withdrawn from the bottom of separator 48 through line 54, is then passed, e.g., by being pumped by means of pump 56, through line 57 into the upper portion of absorber 53. The rate at which the liquid material is recovered from the lower portion of separator 48 is controlled by means of liquid level controller 58 which is operatively connected to separator 48 and to a flow control means, such as motor valve 59, in line 57. Line 60 connected to line 57 provides means for recovering any reformate which it is not desired to pass into absorber 53. Prior to the introduction of the liquid stream into absorber 53, it is flowed through indirect heat exchanger 61 and refrigerated exchanger 62. These two heat exchangers lower the temperature of the liquid stream to a temperature in the range of about 33 to 43° F. Line 63, which leads from a refrigeration unit, not shown, and connecting lines 66 and 64 provide means for supplying liquid refrigerant to refrigerated exchangers 52 and 62. Vaporous refrigerant which is recovered from exchangers 52 and 62 through lines 67 and 68, respectively, is thereafter returned to the refrigeration unit through line 69. Any suitable refrigerant or refrigeration system, such as liquefied petroleum gas, an ammonia-aqua ammonia system, Freon, and the like, can be used to obtain the desired refrigeration.

The vaporous stream introduced into absorber 53 through line 49 comprises hydrogen and light hydrocarbons, such as methane, ethane, propane, butanes, and some pentanes. In the absorber, the gaseous materials contact the liquid hydrocarbon materials (reformate) charged to the absorber through line 57 in countercurrent flow. The absorber vessel is a conventional item of separation equipment, employing a plurality of trays as illustrated in the drawing. The upper portion of the absorber it at a temperature in the range of about 35 to 45° F., while the lower portion of the absorber is at a temperature in the range of about 45 to 55° F. The pressure in the absorber is generally in the approximate range of 390 to 490 p.s.i.g. Upon contacting the vaporous materials, the liquid hydrocarbon materials absorb the light hydrocarbons. As a result, the gaseous stream taken overhead from the absorber through line 71 is enriched with regard to hydrogen and reduced with regard to light hydrocarbons. Since the hydrogen-rich gas is at a relatively low temperature, it serves as the coolant for heat exchanger 51, being passed in indirect heat exchange with the vaporous material recovered from separator 48 through line 49. Thereafter, at least a portion of the hydrogen-rich gas is passed by means of line 72 to compressor 73 wherein the gas is compressed to a pressure sufficient for subsequent introduction into reactor 34, e.g., to a pressure in the range of 500 to 800 p.s.i.g. The hydrogen-rich gas which is not recycled to the reactor is removed from the system through line 76. This hydrogen stream can then be passed to other processes where its use is required, e.g., to a kerosene desulfurizing unit.

The liquid material withdrawn from absorber 53 through line 77 contains the reformate and light hydrocarbons absorbed during contact with the vaporous materials in absorber 53. The rate at which the liquid material is withdrawn from absorber 53 is controlled by means of liquid level controller 78 which is operatively connected to the absorber and to a flow control means, such as motor valve 79 in line 77. Since the liquid material flowing in line 77 is at a temperature in the approximate range of 45 to 55° F., it is conveniently passed through heat exchanger 61 in indirect heat exchange with the liquid material recovered from the bottom of separator 48. After flowing through heat exchanger 61, the liquid stream is sent to a stabilization zone (not shown) wherein the light hydrocarbons are separated from the reformate. The stabilization zone can comprise a debutanizer which is adapted to separate butanes and lighter hydrocarbons from the liquid materials. The light hydrocarbons recovered in this manner can be employed as a fuel gas. The stabilized reformate is then passed to storage facilities or to a blending plant where it is blended to form a finished gasoline product.

A more comprehensive understanding of the invention can be obtained by referring to the following illustrative example which is not intended, however, to be unduly limitative of the invention.

EXAMPLE

A system similar to that shown in the drawing is employed in a catalytic reforming process employing a platinum-alumina-combined halogen catalyst. A hydrocarbon feed material having a boiling point range of from 132 to 414° F. and an API gravity at 60/60° F. of 55.3 is charged to the fractionator at the rate of 20,496 barrels per day. A material having a boiling point range of 95 to 226° F. and an API gravity at 60/60° F. of 71.5 is taken overhead from the fractionator at the rate of 3,144 barrels per day. A material having a boiling point range of 365 to 461° F. and an API gravity at 60/60° F. of 44.6 is withdrawn from the bottom of the fractionator at the rate of 1,680 barrels per day. The material to be charged to the reforming process is recovered from an intermediate portion of the fractionator at the rate of 15,672 barrels per day. This charge material has a boiling point range of 203 to 384° F., an API gravity at 60/60° F. of 53.3, a research octane number, clear, of 50.7, and a research octane number, with 3 cc. of tetraethyllead, of 72.4.

Hydrogen is added to the feed material prior to its introduction into the heater at the rate of 104,500,000 s.c.f./day, an amount such that the mol ratio of hydrogen to hydrocarbon is 7.7 to 1.0. After pasing through the heater, the feed material containing hydrogen is introduced into the first reactor at a temperature of 924° F. and a pressure of 584 p.s.i.g. The reactor effluent from the first reactor, after flowing through the intermediate heater, is introduced into the second reactor at a temperature of 899° F. and a pressure of 569 p.s.i.g. The reactor effluent from the second reactor, after passing through the intermediate heater, is charged to the third reactor at a temperature of 891° F. and a pressure of 522 p.s.i.g. The effluent from the third reactor is passed through a cooler and then introduced into the gas-liquid phase separator. The phase separator is at a temperature of 96° F. and a pressure of 450 p.s.i.g. The vaporous stream containing hydrogen and light hydrocarbons taken overhead from the phase separator is cooled to a temperature of about 82° F. in the heat exchanger and is then further cooled to about 40° F. by being passed through the refrigerated exchanger. The vaporous material is then introduced at this latter temperature into the bottom portion of the absorber. The liquid material recovered from the bottom of the separator is cooled to a temperature of about 38° F. prior to introduction into the upper portion of the absorber. A hydrogen-rich gas is recovered from the upper portion of the absorber at a temperature of about 40° F., while a liquid material containing light hydrocarbons is withdrawn from the bottom of the absorber at a temperature of about 50° F. A pressure of about 440 p.s.i.g. is maintained in the absorber.

The hydrogen-rich stream recovered from the absorber after being passed in indirect heat exchange with the overhead from the phase separator, is at a temperature of about 76° F. and a pressure of about 435 p.s.i.g. This stream is then compressed to a pressure of about 640 p.s.i.g. before being added to the feed material prior to its passage through the heater.

The liquid material containing light hydrocarbons recovered from the bottom of the absorber is then passed to a debutanizer. In the debutanizer, substantially all of the light hydrocarbons are taken overhead, while the reformate is recovered as bottoms product. In the table hereinbelow, data are set forth which show the flow rates of the streams recovered from the indicated pieces of equipment.

Table

|  | Separator Overhead | Separator Bottoms | Absorber Overhead | Absorber Bottoms | Stabilizer Gas (Overhead From Debutanizer) | Reformate (Bottoms From Debutanizer) |
|---|---|---|---|---|---|---|
| Hydrogen | 112,340 | 301 | 112,049 | 592 | 592 |  |
| Methane | 6,250 | 114 | 6,088 | 276 | 276 |  |
| Ethane | 3,320 | 343 | 2,858 | 805 | 805 |  |
| Propane | 3,580 | 1,130 | 2,150 | 2,560 | 2,560 |  |
| Butanes | 1,670 | 1,530 | 100 | 3,100 | 1,960 | 1,140 |
| Pentanes plus | 640 | 13,500 |  | 14,140 |  | 14,140 |
| H₂S | 2 | 2 | 2 | 2 | 2 |  |
| Nitrogen | 4 |  | 4 |  |  |  |
| Total Thousand s.c.f. vapor/day | 127,806 | 16,920 | 123,251 | 21,475 | 6,195 | 15,280 |
| Volume percent H₂ | 87.7 |  | 90.9 |  |  |  |

As indicated hereinabove, hydrogen is added to the feed stock at the rate of 104,500,000 s.c.f./day. In order to add this amount of hydrogen, it is necessary to recycle 114,961,000 s.c.f./day of the gas recovered as absorber overhead (90.9 volume percent hydrogen), leaving 8,290,000 s.c.f./day of hydrogen-rich gas for use in other processes.

Assuming a conventional operation where the overhead from the phase separator is recycled directly to the reactors, it would be necessary to recycle 119,156,000 s.c.f./day of the overhead containing 87.7 volume percent hydrogen in order to supply the necessary hydrogen to the reactor. It is thus seen that by proceeding in accordance with the instant invention, there is a saving of 4,195,000 s.c.f./day in the amount of gas necessary to recycle to the reaction zone. As a result of this saving, the total amount of hydrocarbon feed charged to the system can be increased, thereby producing additionl reformate.

It will be apparent to those skilled in the art that variations and modifications of the invention can be made upon a study of the foregoing disclosure. Such variations and modifications are believed to be clearly within the spirit and scope of the invention.

I claim:

1. In a process in which a hydrocarbon feed material is contacted in a reaction zone with a reforming catalyst and product vapors are recovered from said zone, the improvement which comprises cooling said product vapors to a temperature at which they are partially liquefied; passing the resulting vaporous and liquid materials into a separation zone; recovering vaporous materials comprising hydrogen and light hydrocarbons from an upper portion of said separation zone; recovering liquid hydrocarbon materials from a lower portion of said separation zone; separately refrigerating said vaporous materials to about 35 to 45° F. and said liquid hydrocarbon materials to about 33 to 43° F.; countercurrently contacting said vaporous materials with said liquid hydrocarbon materials in an absorption zone, said contacting occurring under conditions such that light hydrocarbons present in said vaporous materials are absorbed by said liquid hydrocarbon materials; recovering a hydrocarbon stream enriched with light hydrocarbons from a lower portion of said absorption zone; recovering a hydrogen rich stream from an upper portion of said absorption zone; and recycling a portion of said hydrogen rich stream to said reaction zone.

2. In a process in which a hydrocarbon feed material is contacted in a reaction zone with a reforming catalyst and product vapors are recovered from said zone, the improvement which comprises cooling said product vapors to a temperature at which they are partially liquefied; passing the resulting vaporous and liquid materials into a separation zone, said zone being at a temperature in the range of about 85 to 100° F.; recovering vaporous materials comprising hydrogen and light hydrocarbons from an upper portion of said separation zone; cooling said vaporous materials to a temperature in the range of about 35 to 45° F.; introducing the cooled vaporous materials into a bottom portion of an absorption zone; recovering liquid hydrocarbon materials from a lower portion of said separation zone; cooling said liquid hydrocarbon materials to a temperature in the range of about 33 to 43° F.; introducing the cooled liquid hydrocarbon materials into an upper portion of said absorption zone; countercurrent contacting said vaporous materials with said liquid hydrocarbon materials in said absorption zone; recovering a hydrogen rich stream from an upper portion of said absorption zone; recycling a portion of said hydrogen rich stream to said reaction zone; recovering a liquid hydrocarbon stream enriched with light hydrocarbons from a lower portion of said absorption zone; passing said last mentioned stream into a fractionation zone; recovering a vaporous stream comprising light hydrocarbons from an upper portion of said fractionation zone; and recovering a liquid hydrocarbon stream from a lower portion of said fractionation zone.

3. In a system for reforming hydrocarbons, the combination of at least one reactor comprising an enclosed shell; a feed inlet line connected to said shell; an indirect heating means positioned in said feed inlet line; a product outlet line connected to said shell; a gas-liquid phase separator; first conduit means connected between said product outlet line and said separator; an indirect cooling means positioned in said first conduit means; an absorber vessel; second conduit means extending from a lower portion of said separator to an upper portion of said absorber; a first refrigeration means disposed in said second conduit means; third conduit means extending between an upper portion of said separator and a lower portion of said absorber vessel; a second refrigeration means disposed in said third conduit means; fourth conduit means connected between an upper portion of said absorber vessel and said feed inlet line; and an outlet conduit means connected to a lower portion of said absorber vessel.

4. In a process in which hydrocarbon material boiling in the range of about 150 to 400° F. is contacted in a reaction zone with a platinum reforming catalyst in the presence of hydrogen at about 800 to 950° F. and 500 to 800 p.s.i.g. and product vapors are recovered from said zone, the improvement which comprises cooling said vapors to about 85 to 100° F. at 400 to 500 ps.i.g. thereby partially liquefying said vapors, separating the resulting liquid from the remaining vapors, refrigerating said liquid to about 33 to 43° F., refrigerating said remaining vapors to about 35 to 45° F., contacting the thus refrigerated liquid and vapors in countercurrent flow in an absorption column in which the temperature of the upper portion is about 35 to 45° F. and the temperature of the lower portion is about 45 to 55° F. and the pressure is about 390 to 490 p.s.i.g., recovering a hydrogen rich stream from the upper portion of said absorption column, recycling a portion of said hydrogen rich stream to said reaction zone and recovering a liquid hydrocarbon stream enriched with light hydrocarbons from the lower portion of said absorption column.

References Cited in the file of this patent
UNITED STATES PATENTS

| | | |
|---|---|---|
| 2,719,816 | Rich | Oct. 4, 1955 |
| 2,730,556 | Liedholm | Jan. 10, 1956 |
| 2,758,068 | Howard | Aug. 7, 1956 |